(No Model.)  6 Sheets—Sheet 1.

H. E. PAINE.
SOLAR HEATER.

No. 509,391.  Patented Nov. 28, 1893.

Halbert E. Paine.
Inventor:
By Paine and Ladd
Attys.

Attest:
Jno. Hester
Neill S. Brown (No Model.)  H. E. PAINE.  6 Sheets—Sheet 2.
SOLAR HEATER.
No. 509,391.  Patented Nov. 28, 1893.

(No Model.)  6 Sheets—Sheet 3.

H. E. PAINE.
SOLAR HEATER.

No. 509,391.  Patented Nov. 28, 1893.

(No Model.)    6 Sheets—Sheet 4.
H. E. PAINE.
SOLAR HEATER.
No. 509,391.    Patented Nov. 28, 1893.
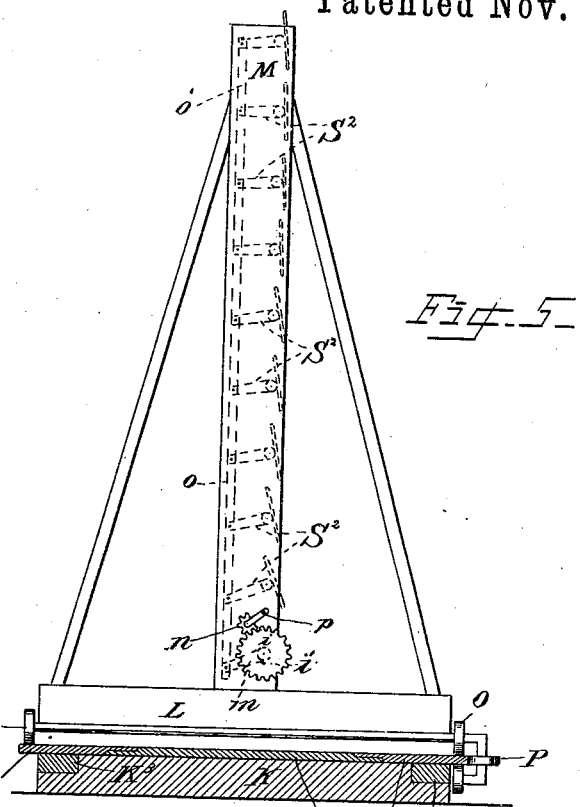
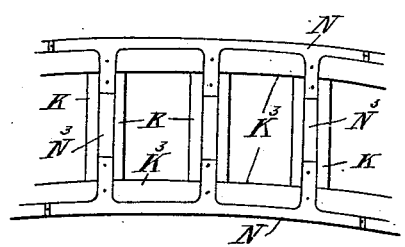
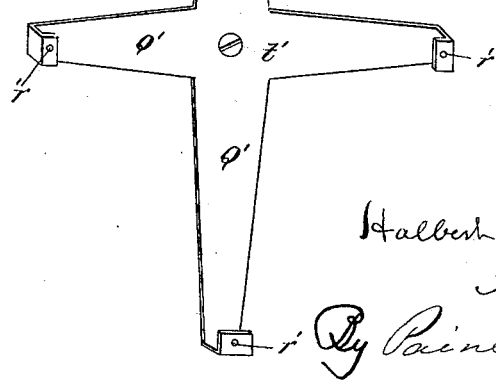

(No Model.)  6 Sheets—Sheet 5.
H. E. PAINE.
SOLAR HEATER.
No. 509,391. Patented Nov. 28, 1893.
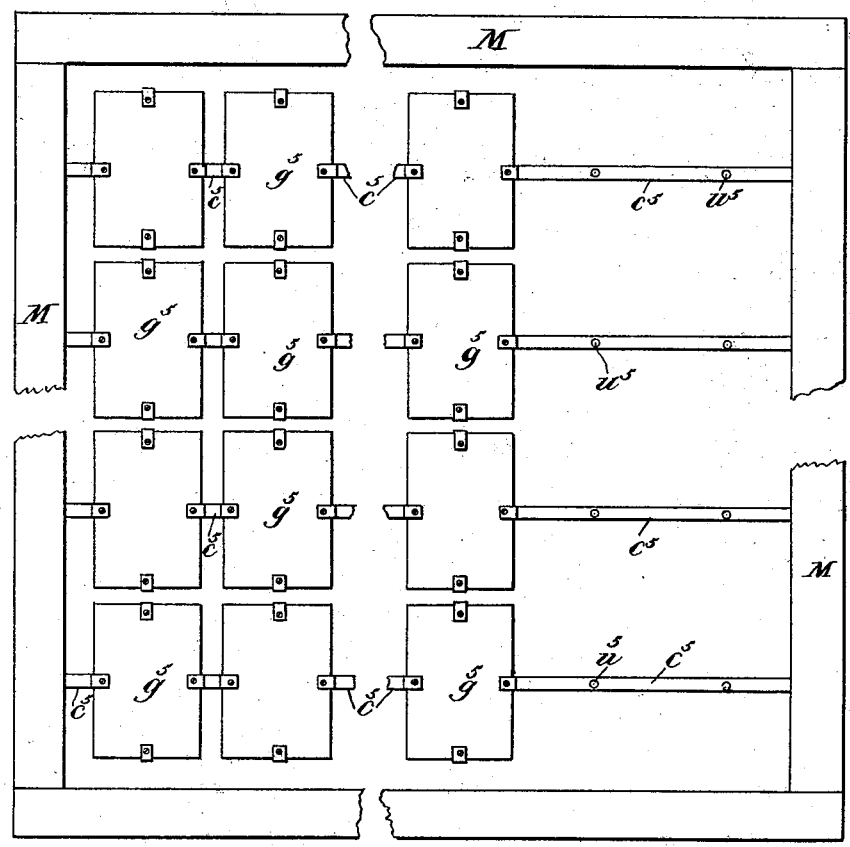
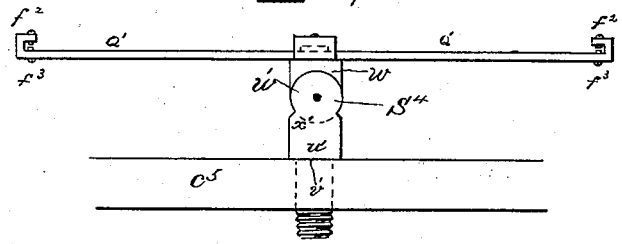
Halbert E. Paine
Inventor:
By Paine and Ladd
Attys.

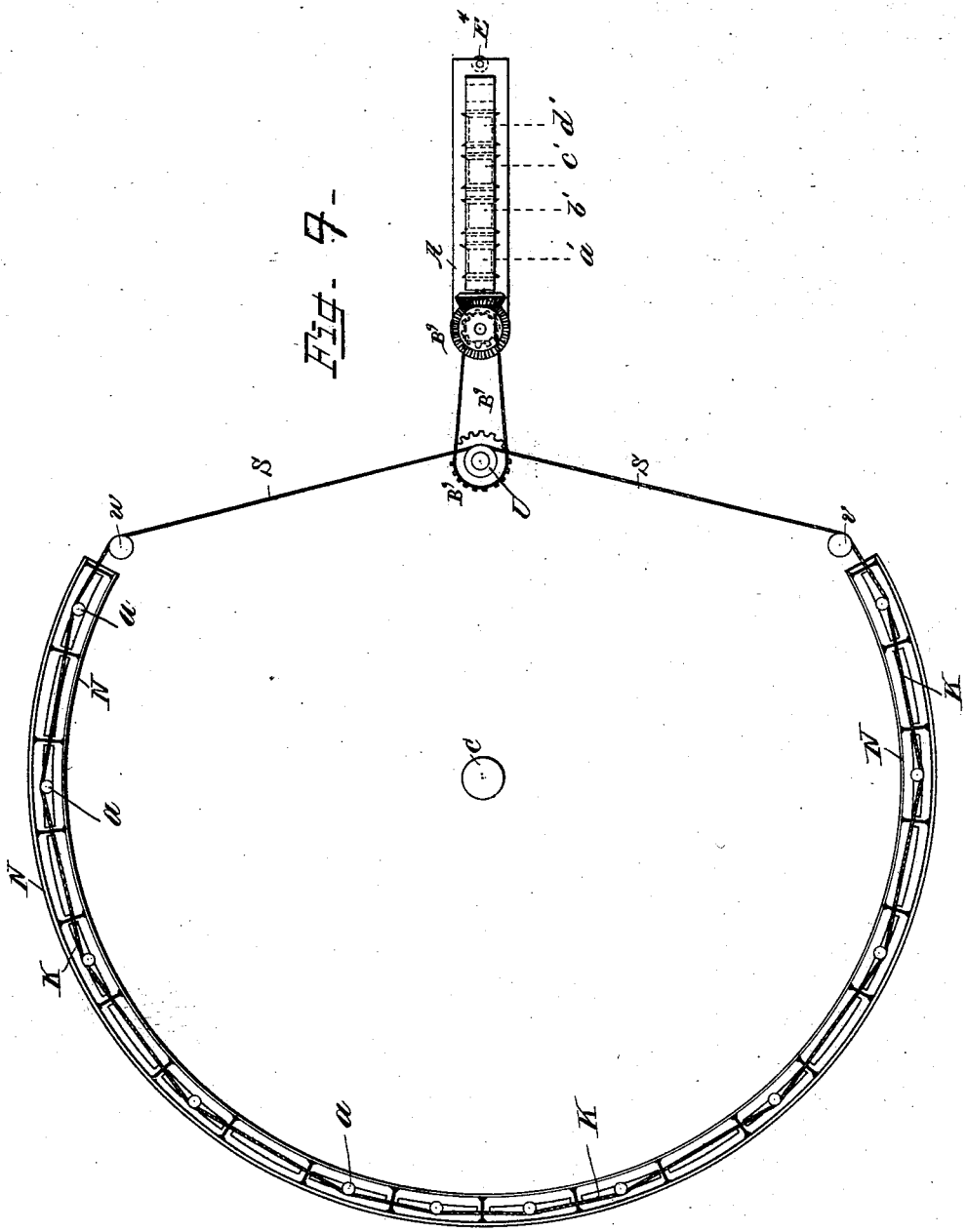

UNITED STATES PATENT OFFICE.

HALBERT E. PAINE, OF WASHINGTON, DISTRICT OF COLUMBIA.

SOLAR HEATER.

SPECIFICATION forming part of Letters Patent No. 509,391, dated November 28, 1893.

Application filed March 15, 1893. Serial No. 466,069. (No model.)

*To all whom it may concern:*

Be it known that I, HALBERT E. PAINE, a citizen of the United States, residing at Washington, in the District of Columbia, have invented certain new and useful Improvements in Solar Heaters; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to improved means for utilizing solar heat for industrial purposes, wherein is employed a group, or assemblage, of mirrors adapted to move in the arc of a circle and in a horizontal, or proximately horizontal plane, the heat receiver being at, or near, the center of a circle.

The invention consists of a novel combination and arrangement of parts, substantially as hereinafter described and claimed.

Figure 1:
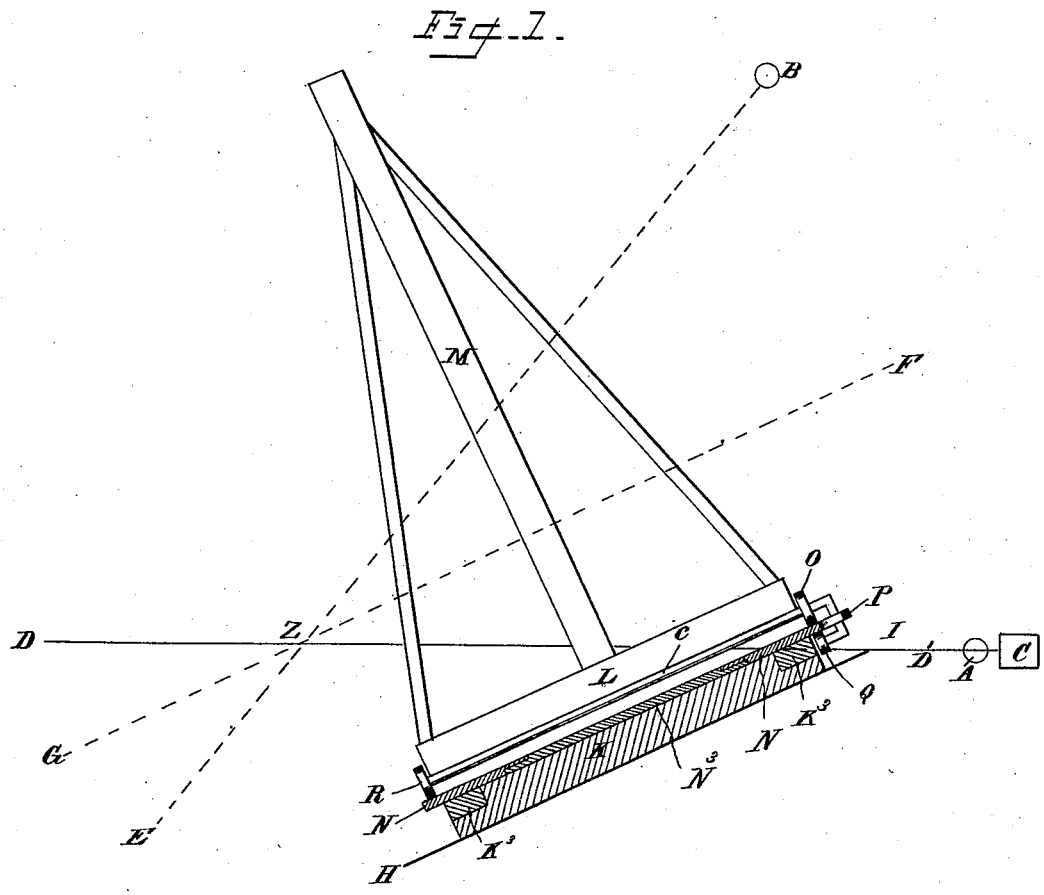
Figure 2:
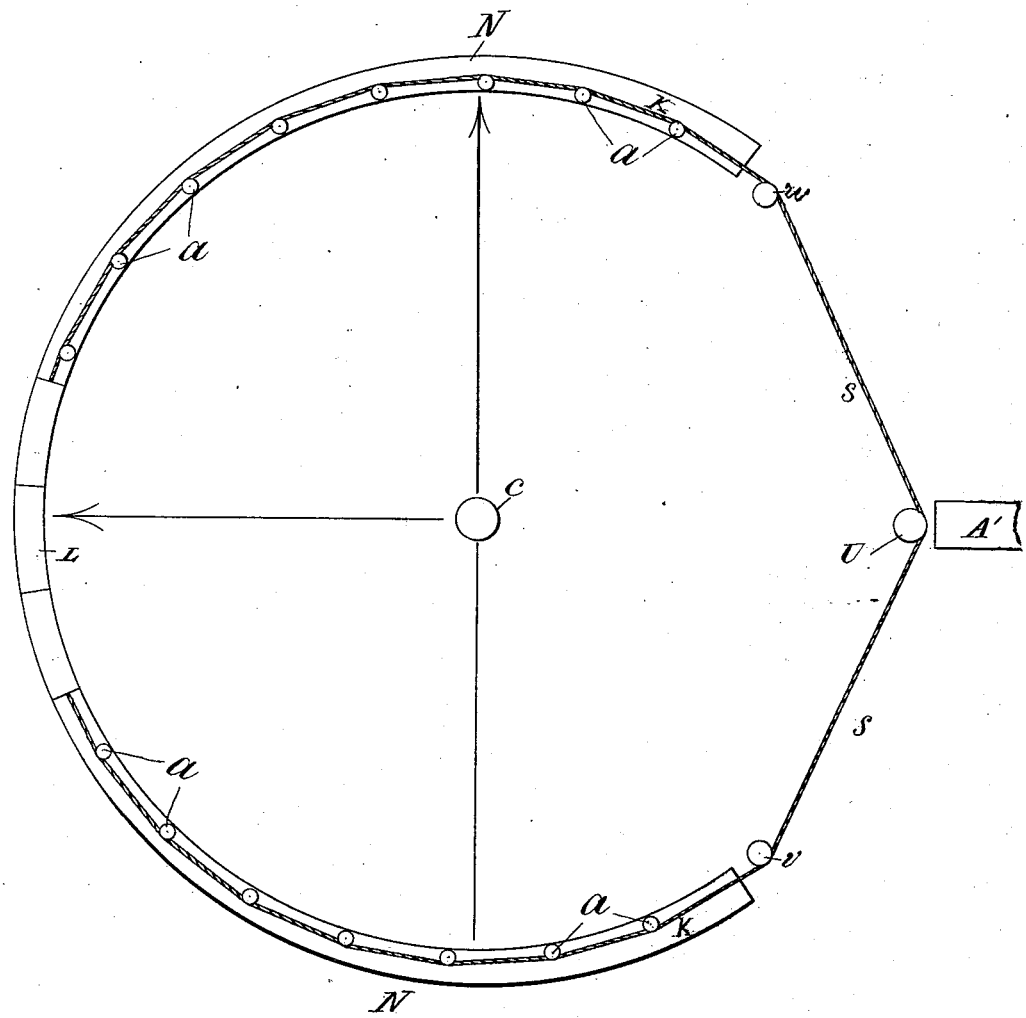
Figure 3:
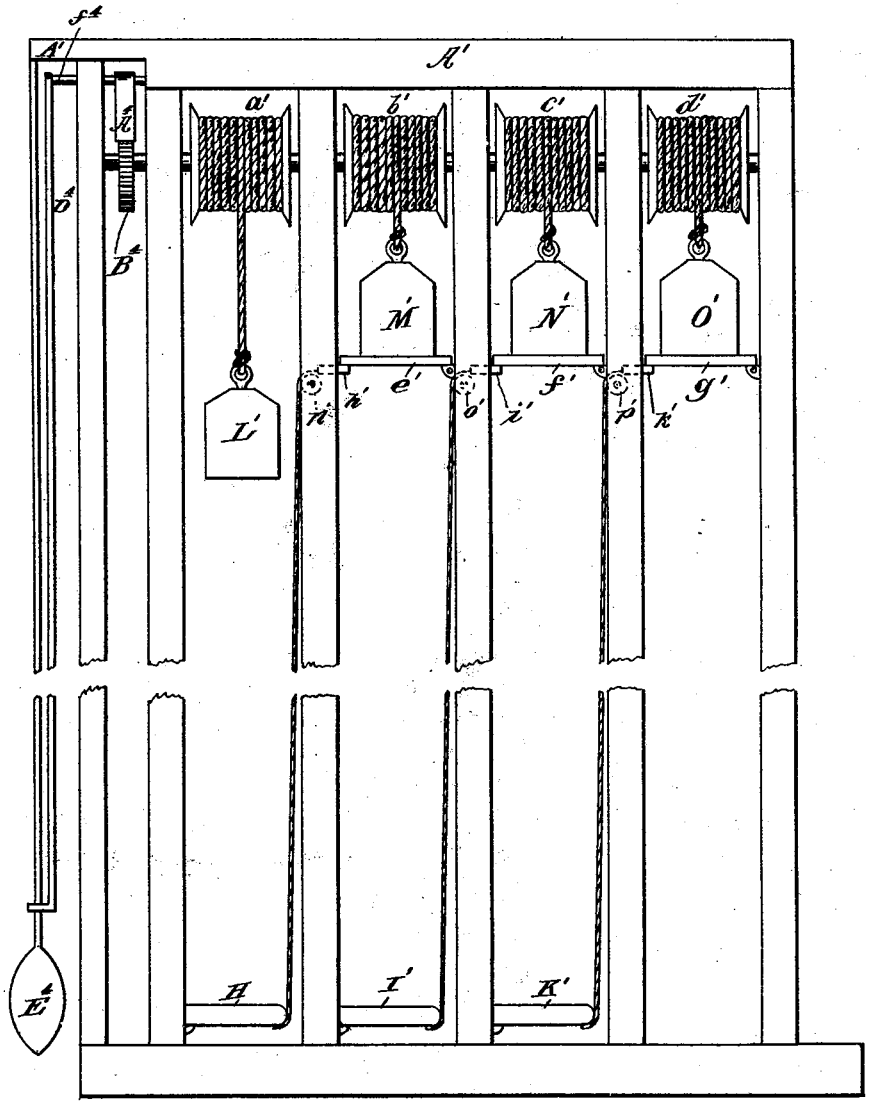

Figure 1 represents the mirror-car at the middle point of the arc of rotation, which point is due north or south of the heat-receiver, the rails, stringers and cross ties being shown in section. Fig. 2 is a top view of the track, showing the cable, drums, car, and heat receiver. The track appears the narrowest at the middle of the arc of rotation because its outward radial inclination is greatest at that point. Fig. 3 is a front view of the clock-work used to effect and regulate the rotation of the mirror-car around the heat receiver. Fig. 4 is a portion of the track showing the rails, stringers and cross ties. Fig. 5 is a side view of the mechanism by which the vertical inclination of the group of mirrors is adjusted. Fig. 6 is a perspective view of the mirror-holder. Fig. 7 shows the top of one of the horizontal mirror axes, with a mirror-holder pivoted to a stud bolted to the mirror-axis. Fig. 8 is a front view of the mirror-frame, containing several mirrors. Fig. 9 is a plan of the track and of the clockwork geared to the windlass.

In Fig. 1 of the accompanying drawings, D D' is the horizon; the position of the sun, A, at sun-rise, is on the prolongation of D D'; B is the sun, at mid-day; C is the heat-receiver on the prolongation of D D'; K a cross tie of the track in section; $K^3$ stringers in section; L the platform of the car in its position at mid-day; M the mirror frame in its position at mid-day; N the iron or steel rails; $N^3$ the cross-bar in section; R, O the car wheels, moving on the upper surfaces of the two rails; P the wheel moving on the interior edge of the interior rail; Q the wheel moving on the lower surface of the interior rail. F G is a line bisecting the angle A Z B. H I is parallel to F G, and the mirror-frame M is perpendicular to F G. The inclination of the cross-tie K to the horizon is half that of the sun's rays.

In Fig. 2, which is a plan of the track, K, K represent the bed of the track; N, N the interior and exterior rails; C is the heat receiver; A' the position of the device for effecting and regulating the movement of the mirror-car; U the windlass; S the cable; $v, w$, and $a, a$, the drums, on which the cable moves; L the platform of the car, in its position at mid-day.

In Fig. 3, L', M', N' and O' represent the weights and $a', b', c'$ and $d'$ the barrels on which the weights are suspended; $e', f', g'$ are the temporary supports; $h', i', k'$ are sliding detents, to which are attached cords passing over the pulleys $n', o', p'$. These cords are made fast to the levers H', I' and K'. $E^4$ is the pendulum; $D^4$ the crutch; $A^4$ the escapement; $B^4$ the balance wheel; $f^4$ the shaft to which the escapement and the crutch are attached.

In Fig. 4, $K^3$, $K^3$ are the stringers or longitudinal supports of the rails; K, K are cross-ties; N, N are rails with arms; $N^3$, $N^3$, are cross-bars, bolted to the interior and exterior rails, and, with them, to the cross-ties, and to the longitudinal supports of the rails.

In Fig. 5, M is the side of the mirror-frame; L the platform of the mirror car; $p$ a crank operating the gear-wheel $n$, which meshes with the gear-wheel $i$; $m$ a crank lever rigidly attached to the wheel $i$. This crank lever raises and depresses the rod $o$. To the rod $o$ are pivoted the arms $S^2$, $S^2$, which arms are rigidly attached to the horizontal axes of the several tiers of mirrors. By means of the crank $p$ a slight daily change of inclination is given to each mirror, corresponding with the daily change occurring in the altitude of the sun, as it moves to and fro between the tropics. By means of this crank also the focus is transferred from one of the openings in the fire box to another.

The mirror-holder, represented in Figs. 6 and 7 of the drawings, is also represented in Fig. 9 of the drawings of my application for Letters Patent filed March 15, 1893, (Serial No. 466,070) and, less in detail, in Figs. 4 and 9 of my application for Letters Patent, filed March 15, 1893 (Serial No. 466,068). I do not, in this application, or in my application, Serial No. 466,068, claim this mirror-holder as a distinct invention, but only as an element of the combinations described as including it. I do claim it as a distinct invention in my application, Serial No. 466,070.

In Fig. 6, $Q'$ $Q'$ are the arms of the mirror-case-holder; $t'$ is the bolt by which the mirror-case-holder is attached to its stud; $r'$, $r'$ are screw-holes, through which pass set screws; counter-acting set screws, not shown on the drawings, pass through the arms opposite these screws; the screws and counter-acting screws are used to effect slight adjustments for the correction of defects of workmanship. All the clasps at the extremities of the arms, except the upper one, are rigidly attached to the arms. The upper clasp is movable. It is removed to admit the mirror-case, and is afterward fastened to the arms by the screws $S'$, $S'$.

In Fig. 7, $u'$ represents the stud by which the mirror-case-holder is attached to the horizontal axis $c^5$; $v'$ is the part which passes through the axis, terminating in the screw which enters the nut, whereby the stud is rigidly attached to the axis; $Q'$ represents the arms of the mirror-case-holder; $f^2$, $f^2$ the screws, and $f^3$, $f^3$ the counter-acting screws, by which slight adjustments of the mirror-case are effected; $w'$ is the front extremity of the stud; $x'$ the rear extremity of the part of the mirror-case-holder which is pivoted to the stud, at $S^4$.

In Fig. 8, M is the mirror frame, $c^5$ the horizontal axis which, in order to be light and stiff, may be hollow; $g^5$ the reflectors, each held by four clasps, a part of the mirrors being removed to show the screw-bolts $u^5$.

In Fig. 9, N represents the track; K the bed of the track; S the cable; $a$, $a$, $w$, $v$, rollers; C the heat-receiver; A the top of the frame of the clock-work; $a'$, $b'$, $c'$, $d'$, the drums; U the windlass; $B^9$ the gearing connecting the clock-work with the windlass; and $E^4$ the pendulum.

In the practice of my invention, I provide a curved track N N, whose rails are laid upon a suitable bed K K, a car L, carrying the mirror-frame M, with its mirrors or reflectors, and traveling upon said rails, and a heat-receiver C, arranged with relation to said track as shown, being at or near the center of the circle of which the track is an arc. Having fixed the position of the heat-receiver, and determined the distance of the track therefrom, I lay out the curve of the track upon a horizontal or proximately horizontal surface as follows: I ascertain at what points, on the horizon, the sun rises and sets, at the seat of the proposed operations, at the time of the summer solstice, and determine the length, in degrees and minutes, of the arc of the horizon included between these two points, and then lay out for the track an arc of the same number of degrees and minutes, with a radius equal to the distance of the track from the heat receiver, the middle of this arc being its most northerly point in the northern hemisphere, and its most southerly point in the southern hemisphere. At the terminal points of the arc the track is made level;—that is to say, the ends of the two opposite rails are laid, at those points, in the same horizontal plane. Every change in the vertical angle, made by the sun's rays with the horizon, involves a change, in the inclination of the reflectors to the horizon, equal to one half of the angular change in the sun's position, as shown in Fig. 1. Therefore, at the middle point of the arc of rotation, I lay the exterior or outer rail of the track so much lower than the interior rail that a radial line, drawn across the upper surfaces of the two rails, at that point, makes with the horizon an angle equal to one half of the vertical angle made by the sun's rays with the horizon at midday, at the summer solstice, in the latitude of the place where the track is constructed. I make the angle formed with the horizon, by the radial line crossing the upper surfaces of the rails, gradually and regularly increase from the initial point of the arc of movement, where this line is horizontal and the angle nothing, to the middle point of the arc, where the angle is greatest, being equal to half the angle formed with the horizon by the rays of the sun, at midday, at the summer solstice. In like manner I make this angle uniformly decrease from the middle to the end of the arc of movement.

The rails of the track N N are secured upon sleepers or stringers $K^3$, and connected together by cross-bars $N^3$; and upon the track travels a car L, whose wheels R, O, may be held thereto by a wheel P traveling against the inner edge of the inner rail N, and a wheel Q bearing against the under side of the same rail, or by any other suitable means or method. The wheels P, Q, are carried by a right-angled extension of one end of the axle $c$ which carries the wheels O R.

The reflector-frame M is so arranged upon the car L that, at the initial point of the arc of rotation, the sun's rays make a predetermined vertical angle with the plane of the reflector-frame when the central reflector reflects the sun's image upon the heat receiver. If several reflector-frames are used, they are so disposed that the sun's rays make this prescribed vertical angle with the plane of the middle frame, when reflected upon the heat-receiver by the central reflector of the middle frame. If the movement of the car on its track corresponds with the apparent diurnal motion of the sun around the earth, the sun's rays will fall upon the central reflector from sun-rise until sun-set, in such direction that their angle of incidence, upon the central reflector, and their angle of reflection, upon the heat-receiver, will be constantly equal. While the movement of the car, corresponding with that of the sun, continues, all the individual reflectors are so adjusted that they reflect images of the sun upon the heat-receiver. Except in the event of accidental disarrangement, no further adjustment of the parts will ever be necessary, beyond making the slight changes, in the vertical inclination of the mirrors, required to meet the changes in the altitude of the sun resulting from its apparent movement between the tropics. The mechanism for effecting these slight changes will be hereinafter described.

The relation between changes in the altitude of the sun and changes in the vertical inclination of the mirrors is illustrated diagraphically in Fig. 1. F G is a line bisecting the angle A Z B; H I is parallel to F G; and the mirror frame M is perpendicular to F G. The inclination of the cross-bar $N^3$ to the horizon is half that of the sun's rays thereto.

The car may be moved by any suitable motor,—by hand, through a train of gearing, or automatically, by steam, water, electric, or other power, regulated by clockwork or by hand. It may be moved by the following described mechanism:—Upon a suitable framework or support is arranged a series of drums or barrels, $a'$ $b'$ $c'$ $d'$, whose shaft is suitably journaled therein and carries a balance-wheel $B^4$, engaged by an escapement $A^4$, whose shaft $f^4$ also has secured to it a crutch $D^4$, through the lower end of which passes a pendulum $A^4$, depending from the frame-work or support $A'$. The shaft or axis of the drums is put into suitable operative connection with a windlass U, which drives the cable S and moves the car L and the compassing rolls or wheels $v$, $w$, $a$, $a$, on the bed of the track. Around the drums or barrels are wound cords or lines suspending weights, L', M', N', O', the latter three of which are temporarily supported upon shelves $e'$, $f'$, $g'$ hinged, at one end, to uprights of the frame-work $A'$, while, at their opposite ends, they rest upon slides $h'$, $i'$, $k'$, arranged, respectively, in openings in said uprights, and connected by cords or lines to levers H', I', K', hinged or pivoted to uprights of the frame-work, in alignment with the weights. The weights, therefore, as they successively descend to their lowest points, actuate successively the lever H', I', K', withdrawing the slides $h'$, $i'$, $k'$, from under the free ends of the shelves or supports $e'$, $f'$, $g'$, and thus providing for the rotation of the shaft bearing the barrels or drums $a'$, $b'$, $c'$, $d'$, by each of the weights in succession, the purpose of which is obvious.

To provide for the simultaneous elevation or depression of all the reflectors in each frame M, I secure to the series of axes, bearing the reflectors, crank-arms $S^2$, $S^2$, connecting the latter with rods $o$, $o$, and provide one of said axes with a gear-wheel $i$, and gear therewith a pinion $n$, suitably journaled upon the mirror-frame and actuated by a crank $p$. By means of this device all the mirrors are made to reflect images of the sun upon the heat-receiver in the morning; and they continue to do so during the day.

To commence work, upon the completion of the apparatus, or to resume it, after a temporary suspension, it is necessary (after the summer solstice) to depress the rods, $o$, $o$, by means of the crank $p$, until all the mirrors reflect images of the sun upon the heat-receiver.

Q' is a (preferably four-armed) mirror-case-holder fastened by a screw $t'$ to a short stud $w$, shouldered, as at $w'$, and rounded at its free end, as at $x'$, and fitting and pivoted in the socketed end of a screw bolt $u'$, this screw-bolt being also shouldered, as at $v'$, and held by a nut to a horizontal axis carried by the mirror-frame. This short stud $w$ turns on its pivot $S^4$. The mirror-case is preferably air-tight. The pivot, $S^4$, is the vertical or proximately vertical axis of the reflector, each reflector having its own separate vertical or proximately vertical axis. To each of the horizontal axes a series, or tier, of reflectors is attached, by the screw-bolts $u'$. The horizontal axes may, if of considerable length, be hollow tubes of iron, aluminium, or other metal, and may be supported, at intervals, by cross-supports extending from the upper to the lower part of the mirror-frame.

The mirror-case-holder Q' has three of its arms bent at their outer ends, to form clasps, and the fourth arm provided, at its outer end, with a removable bent plate forming therewith also a clasp, which, with the other clasps, receives the mirror-case; and within these clasps the latter is held by set screws $f^2$. Additional screws $f^3$, counteracting the screws $f^2$, are employed to rectify the position of the mirror-case in its holder. The removable bent plate, connected by screws S', S', to the arm of the holder Q', carrying it, permits the insertion of the mirror case into the clasps.

Suppose the exterior rails of the track to be respectively arcs of a circle measuring, say, six feet in length on their exterior edges, and the interior rails to be arcs of a concentric circle having their extremities bounded by the same radii which bound the extremities of the exterior rails. Then one pattern will suffice for casting all the exterior rails required between the initial point of the arc of movement and middle point of that arc, and one pattern will suffice for casting all the interior rails required between the initial point and middle of the arc of motion. In like manner one pattern will suffice for all the exterior rails, and one for all the interior rails, required between the middle and the end of the arc of motion. These patterns may be made of metal, with a close approximation to absolute mechanical accuracy and, if they are so made, and the cross-ties are accurately inclined and bedded, sufficient exactness of workmanship, in the construction of the track, may be easily attained.

Suppose the base of operations to be on a parallel of latitude where the sun's rays, at the summer solstice make with the horizon, at midday, an angle of A degree, and the arc of the horizon, included between the points where the sun rises and sets, at the summer solstice, to be two-thirds of the circle of the horizon. The inclination of the track, at the middle of the arc of rotation, will be one-half A degree. And if the radius of the arc of rotation is for example, fifty feet, the entire circumference of the circle will be 314.16 feet, and one half of the arc of rotation will be, in length, one third of 314.16 feet, that is to say, 104.72 feet. The increment of inclination, for each foot of the arc, is therefore one-half A degree divided by 104.72; and for six feet, the length of the rail, it is one-half A degree divided by 17.45. It follows that each rail six feet in length will, at its extremity nearest the middle of the arc of motion, have an outward radial inclination to the horizon greater, by this latter increment, than at the extremity farthest from the middle of the arc of motion.

It will be understood that I make no specific or separate claim herein, to the means for effecting the movement of the car, or for adjusting the reflectors individually or collectively, or to a heat-receiver.

I claim—

1. In mechanism for utilizing solar heat for industrial purposes, the combination of means for carrying an assemblage or group of reflectors, and of a track whose rails are arranged in the arc of a circle, and have an outward radial inclination gradually increasing from the initial point to the middle of the arc of motion, and gradually diminishing from the middle to the end of the arc, whereby is maintained a uniform vertical inclination of the plane of the mirror-frame to the sun's rays from sunrise to sunset, substantially as set forth.

2. In mechanism for utilizing solar heat for industrial purposes, the combination of a car carrying a group of reflectors; means for adjusting the vertical inclination of the reflectors to the sun's rays; and a track whose rails are arranged in the arc of a circle, and have an outward radial inclination gradually increasing from the initial point to the middle of the arc of motion, and gradually diminishing from the middle to the end of the arc, substantially as set forth.

3. In mechanism for utilizing solar heat for industrial purposes, the combination of a car carrying a group of reflectors; a track whose rails are arranged in the arc of a circle, and have an outward radial inclination gradually increasing from the initial point to the middle of the arc of motion, and gradually diminishing from the middle to the end of the arc; and means for automatically effecting and regulating the rotation of the group of reflectors, substantially as specified.

4. In mechanism for utilizing solar heat for industrial purposes, the combination of the track, whose rails are arranged in the arc of a circle, and have an outward radial inclination gradually increasing from the initial point to the middle of the arc of motion, and gradually diminishing from the middle to the end of the arc; the group or series of reflectors carried by a car traveling on said rails; and means to effect slight daily changes in the vertical inclination of the reflectors, to correspond with the slight daily changes in the sun's altitude resulting from its apparent movement to and fro between the tropics, substantially as described.

5. In mechanism for utilizing solar heat for industrial purposes, the combination of the car, carrying a group of reflectors adapted to maintain a uniform vertical inclination to the sun's rays; rails arranged in the arc of a circle, and having an outward radial inclination, gradually increasing from the initial point to the middle of the arc of motion, and gradually diminishing from the middle to the end of the arc; and a heat receiver, substantially as set forth.

6. In mechanism for utilizing solar heat for industrial purposes, the combination of the track, whose rails are arranged in the arc of a circle, and have an outward radial inclination, gradually increasing from the initial point to the middle of the arc of motion, and gradually diminishing from the middle to the end of the arc; a car traveling upon such a track and carrying a reflector-frame provided with several tiers or series of reflectors, each series being arranged upon a separate horizontal axis each axis being rigidly attached to an arm, and all the arms pivoted to a common rod; and a gear-wheel fixed to one of the axes and geared to a pinion carrying a crank or handle, substantially as set forth.

7. In mechanism for utilizing solar heat for industrial purposes, the combination of a track whose rails are arranged in the arc of a circle, and have an outward radial inclination gradually increasing from the initial point to the middle of the arc of motion, and gradually diminishing from the middle to the end of the arc; a car traveling upon said track and carrying a series of reflectors so arranged as to be capable of simultaneous and uniform changes of vertical inclination; and the reflector-case-holders having arms provided with clasps to engage the reflector cases, and having studs pivoted to shouldered and threaded bolts secured to horizontal axes carried by the reflector frame, substantially as set forth.

In testimony whereof I affix my signature in presence of two witnesses.

HALBERT E. PAINE.

Witnesses:
 LIZZIE CATLETT,
 THOS. S. HOPKINS.

It is hereby certified that in Letters Patent No. 509,391, granted November 28, 1893, upon the application of Halbert E. Paine, of the District of Columbia, for an improvement in "Solar Heaters," errors appear in the printed specification requiring correction as follows: On page 4, in lines 20, 26, 33, and 34-5, the letter and word "A degree" should read $A°$; and that the said Letters Patent should be read with these corrections therein to conform to the papers pertaining to the case in the Patent Office.

Signed, countersigned, and sealed this 5th day of December, A. D. 1893.

[SEAL.]

JNO. M. REYNOLDS,
*Assistant Secretary of the Interior.*

Countersigned:

JOHN S. SEYMOUR,
*Commissioner of Patents.*